A. Putnam Jr,
Water Cooler.
No. 111,680.   Patented Feb. 7. 1871.
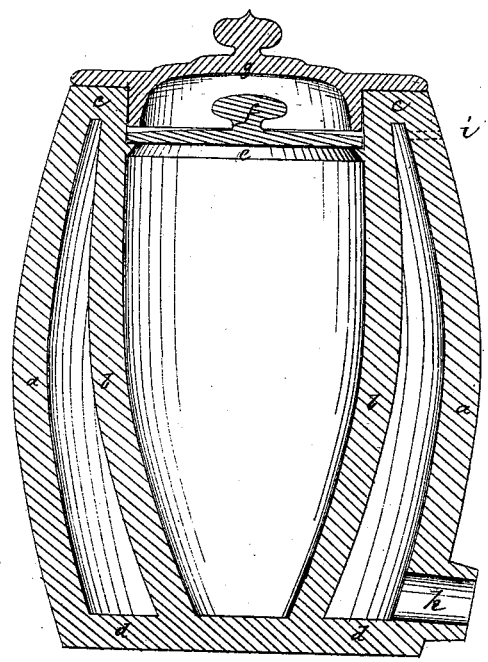
Witnesses:
Inventor:
Abel Putnam Jr
per
Attorneys.

United States Patent Office.

ABEL PUTNAM JR., OF SARATOGA SPRINGS, NEW YORK.

Letters Patent No. 111,680, dated February 7, 1871.

IMPROVEMENT IN WATER-COOLERS.

The Schedule referred to in these Letters Patent and making part of the same.

*To all whom it may concern:*

Be it known that I, ABEL PUTNAM Jr., of Saratoga Springs, in the county of Saratoga and State of New York, have invented a new and Improved Water-Cooler; and I do hereby declare the following to be a full, clear, and exact description of the same, reference being had to the accompanying drawing making a part of this specification, in which the figure is a sectional elevation.

This invention relates to a water-cooler, in which there are two separate compartments, one to contain water and the other to contain ice, the water-space being annular and exterior to the ice compartment, and each chamber having an opening of its own, the one for the insertion of ice and the removal of the water into which it melts, and the other both for the injection and drawing off of water, the advantage of this arrangement being that a cheap quality of ice may be used, which, without imparting any bad taste to the water, or rendering it impure, at the same time answers as well for cooling it as pure and more expensive ice.

Referring to the drawing, there is shown a double earthen vessel, constructed with an outer jar, *a*, and an inner jar, *b*, these two jars being of equal depth, and connected at top and bottom by rings *c d*, formed all in one piece with the jars, so that there is no communication between the one jar and the other.

The inner jar is open at the top, and has a horizontal interior flange, *e*, near its upper end, on which rests the inner cover *f*.

The outer cover *g* rests on the upper connecting-ring *c*.

This construction of the vessel forms two chambers, one of cylindrical, conical, or other homogeneous shape, within the jar *b*, for the reception of ice or other cooling material, and the other of annular shape, between the outer and inner jars, for the reception of water.

At one side of the outer jar, and at its lower end, is an orifice, *k*, opening into the annular water-chamber, and serving as a passage both for the injection of water under pressure and for its withdrawal.

Vessels to be used as a water-cooler I provide at top with a small hole, which serves the double purpose of vent and filling-hole, the orifice *k* being occupied by an ordinary spigot. But in vessels to be used for holding mineral-water, which are made without any hole in the top, my improved spigots, patented November 1, 1870, should be inserted in the orifice *k*, and as this spigot has a flexible pipe that is connected with a vent-tube which floats on the surface of the mineral water, there is no need, when the said spigot is employed, of the hole *i*.

The annular water-chamber, it is obvious, is peculiarly adapted to the exposure of its contents to the frigorific action of the material within the ice-chamber.

Having thus described my invention,

What I claim as new, and desire to secure by Letters Patent, is—

The arrangement of the concentric jars *a b*, so connected that there is no communication between the two, the inner jar being open at the top and the outer jar being furnished with an orifice, *k*, at its lower end, all as specified.

A. PUTNAM, JR.

Witnesses:
SOLON C. KEMON,
CHAS. A. PETTIT.